US006809720B2

(12) United States Patent
Malamud et al.

(10) Patent No.: US 6,809,720 B2
(45) Date of Patent: *Oct. 26, 2004

(54) INFORMATION CURSORS

(75) Inventors: Mark A. Malamud, Seattle, WA (US); John E. Elsbree, Redmond, WA (US); David A. Barnes, Seattle, WA (US); Erik A. Gavriluk, Los Angeles, CA (US); Valerie Horvath, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/164,572

(22) Filed: Jun. 10, 2002

(65) Prior Publication Data

US 2002/0149612 A1 Oct. 17, 2002

(Under 37 CFR 1.47)

Related U.S. Application Data

(63) Continuation of application No. 08/329,724, filed on Oct. 26, 1994, now Pat. No. 6,437,800, which is a continuation of application No. 08/054,564, filed on Apr. 28, 1993, now abandoned.

(51) Int. Cl.[7] .................................................. G09G 5/08
(52) U.S. Cl. ...................... 345/157; 345/163; 345/168; 345/705; 345/711; 345/856
(58) Field of Search ............................... 345/156–157, 345/161, 163, 167–168, 179, 705, 711, 714–715, 769, 779, 808, 809, 856

(56) References Cited

U.S. PATENT DOCUMENTS 4,789,962 A * 12/1988 Berry et al. ................. 345/715

| 4,984,152 A | | 1/1991 | Muller ........................ 364/200 |
| 5,157,768 A | * | 10/1992 | Hoeber et al. ............... 345/711 |
| 5,169,342 A | | 12/1992 | Steele et al. ................. 434/112 |
| 5,287,448 A | * | 2/1994 | Nicol et al. .................. 345/707 |
| 5,408,606 A | * | 4/1995 | Eckart ......................... 345/505 |
| 5,436,637 A | * | 7/1995 | Gayraud et al. ............. 345/705 |
| 5,471,575 A | * | 11/1995 | Giansante .................... 707/503 |
| 5,546,521 A | * | 8/1996 | Martinez ...................... 345/711 |

FOREIGN PATENT DOCUMENTS

| JP | 63-256987 A | 10/1988 |
| JP | 3-112795 | 11/1991 |

OTHER PUBLICATIONS

"Treasures of the Smithsonian, Evaluation", Meckler Corporation (from DIALOG), pp. 1–4, May 1992.

"User–Controlled Display of Hypermedia Links via Mouse Location," *IBM Technical Disclosure Bulletin*, New York, Aug. 1993, vol. 36 (8), p. 669.

Kurt Matthies, "Balloon Help Takes Off", *Power Tools, Power Programming*, Mac User, Dec. 1991, 5 pages.

(List continued on next page.)

*Primary Examiner*—Henry N. Tran
(74) *Attorney, Agent, or Firm*—Banner & Witcoff, Ltd.

(57) ABSTRACT

Information cursors are provided for use in an operating system and/or application programs. Each information cursor includes a pointing portion to point to objects displayed on a video display and an information portion to display information about an object to which the pointing portion points. The information displayed in an information cursor may include the name of the object, a preview of the contents of the object, or property information about the object.

16 Claims, 6 Drawing Sheets

OTHER PUBLICATIONS

*Macintosh Reference 7*, Apple Computer, Inc., Chapter 1, "A Review of Standard Macintosh Operations", 1991, pp. 30–31.

"Unobtrusive Application Icon Label Interface", *IBM Technical Disclosure Bulletin*, New York, Nov., 1990, vol. 33 (6A), p. 104.

Masaru Nemoto, "world of Macintosh System 7.0," *Nikkei Byte*, Japan, published by Nikkei BP, Jun. 1, 1991, vol. 86, pp. 198–206.

Katsushi Ohkouchi, "System, 7 shipping start (Japanese version will be next spring or after)," *Interface*, Japan, published by CQ publication, Jul. 1, 1991, vol. 17, No. 7, pp. 246–250.

* cited by examiner

INFORMATION CURSORS

CROSS-REFERENCE TO RELATED APPLICATIONS

This application is a continuation of U.S. patent application Ser. No. 08/329,724, filed Oct. 26, 1994, now U.S. Pat. No. 6,437,800, which in turn is a continuation of U.S. patent application Ser. No. 08/054,564, filed Apr. 28, 1993, now abandoned

TECHNICAL FIELD

The present invention relates generally to data processing systems and, more particularly, to information cursors for use on video displays of data processing systems.

BACKGROUND OF THE INVENTION

Many operating systems provide a cursor that indicates a current position on a video display. The cursor is generally manipulable by an input device, such as a keyboard or a mouse. In certain operating systems, such as the Microsoft WINDOWS, version 3.1, operating system, which is sold by Microsoft Corporation of Redmond, Washington, a window may have a status bar that displays information about the object to which the cursor is currently pointing. As the cursor is moved to point at different objects, the contents of the status bar changes accordingly. The status bar is a separate graphic entity that is not connected to the cursor and does not move with the cursor. The status bar is positioned on the video display at a fixed location within a window. As such, a user has to look at two separate portions of the screen if he wishes to view both the cursor and the status bar. This separation of the status bar from the cursor can be confusing and burdensome to the user.

SUMMARY OF THE INVENTION

In accordance with a first aspect of the present invention, a method is practiced in a data processing system having a video display and an input device. In this method, objects, including an information cursor, are displayed on a video display. The cursor is positioned over at least a portion of one of the objects that is displayed in response to a user using the input device. Information about the object which at least a portion of the cursor is over is displayed on the video display.

The information that is displayed as part of the cursor may include a name of the object, a preview of the contents of the object, or property information about the object. The property information may include help information regarding the object. Furthermore, the input device may be a mouse that is used to position the cursor.

The information cursor may be displayed as having a pointing portion for pointing to objects on the video display and an information portion for displaying information about the object. The information cursor may be specified as "On" or "Off". When the information cursor is specified as "On", information about the object is displayed as part of the cursor. However, when the information cursor is specified as "Off", such information is not displayed as part of the cursor.

In accordance with another aspect of the present invention, a cursor, a source-object icon for a source object, and a destination-object icon for a destination object are displayed on a video display. The cursor is moved to point to the source object icon in response to movements of a mouse by a user. A name of the source object is displayed as part of the cursor on the video display. In response to the user depressing the button of the mouse while the cursor points to the source-object icon and moving the mouse while keeping the button depressed, the source-object icon is dragged over the video display to where the destination-object icon is positioned. The cursor then points to the destination object icon and the name of the destination object is displayed along with the name of the source object as part of the cursor.

In accordance with still another aspect of the present invention, a method is practiced wherein a pointing portion of an information cursor is displayed on the video display. The pointing portion points to an icon associated with an object. Information about the object that is associated with the icon to which the pointing portion points is displayed as part of the information cursor.

In accordance with a further aspect of the present invention, a data processing system includes a video display and an input device that is operable by a user to communicate with the data processing system. The data processing system includes a means for producing a user interface on the video display and a means for displaying objects on the user interface. The data processing system further includes a means for displaying a cursor and for moving the cursor in response to a user operating the input device. The cursor has an indicator portion and information display portion. The indicator portion indicates a user selected one of the objects that is displayed on the user interface. In addition, the data processing system includes a means for displaying information in the information display portion of the cursor regarding the object that is indicated by the indicator portion of the cursor.

The means for displaying information may include a means for displaying a name of the object, a means for displaying a preview of the object, or a means for displaying property information about the object. Still further, the data processing system may include a means for turning "On" or "Off" the cursor such that when the cursor is turned "Off", the means for displaying information is deactivated.

DETAILED DESCRIPTION OF THE INVENTION

The present invention provides "information cursors" which display graphical or textual information about an object to which the cursor points. Each information cursor has two portions: a pointing portion and an information portion. The pointing portion points to a position on a video display. The information portion displays textual or graphical information about the object to which the pointing portion points. Information cursors are made available by an operating system to applications that are run on the operating system. Information cursors are available in a number of different varieties. Four varieties of information cursors are provided by the preferred embodiment. The four varieties of information cursors are name cursors, preview cursors, combined name and preview cursors and property cursors. The four types of information cursors are described in more detail below.

Figure 1:
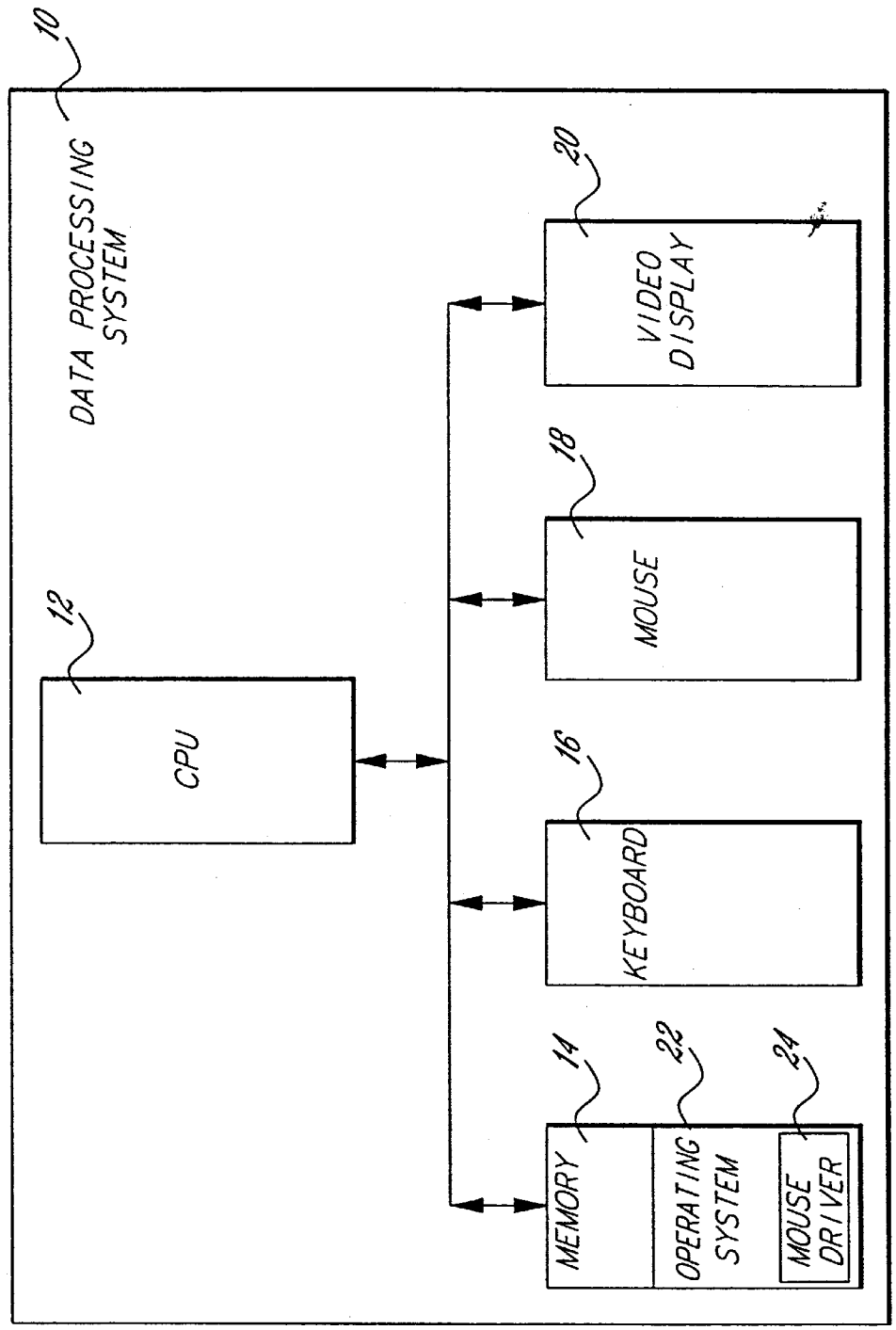
FIG. 1 is a block diagram of a data processing system for practicing a preferred embodiment of the present invention.

FIG. 1 is a block diagram of a data processing system 10 that is suitable for practicing the preferred embodiment of the present invention. The data processing system 10 includes a central processing unit (CPU) 12 that oversees operation of the system. The data processing system 10 also includes a memory 14, a keyboard 16, a mouse 18, and a video display 20. The memory 14 may include different types of storage, such as RAM, ROM, or disk storage. The memory 14 holds a copy of an operating system 22. A mouse driver 24 is provided within the operating system 22 to drive the mouse 18.

Figure 2A:
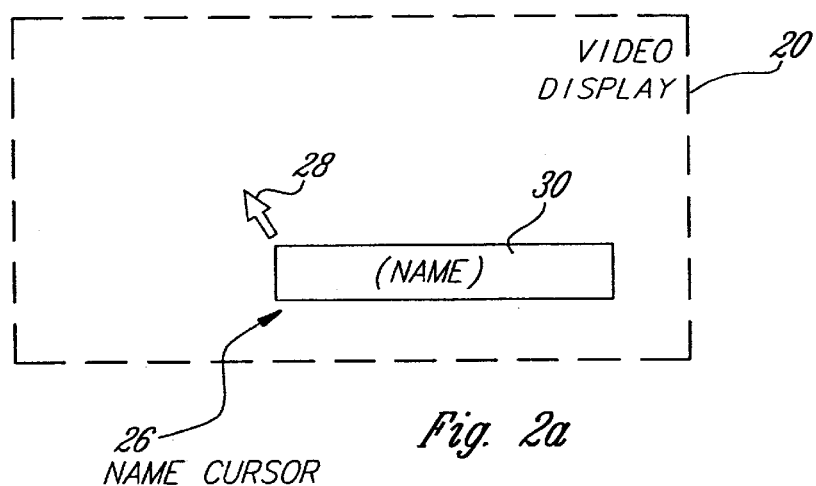
FIGS. 2a, 2b and 2c each contain a diagram showing an example of a name cursor generated in accordance with the preferred embodiment of the present invention.

Before discussing the implementation details of the information cursors in the preferred embodiment of the present invention, it is helpful to further examine the different varieties of information cursors that are provided by the preferred embodiment. FIG. 2a shows an example of a name cursor 26 displayed on the video display 20. Name cursor 26 includes a pointing portion 28 (i.e., a conventional pointing cursor) and a name box 30. The name box 30 displays the name of the object to which the pointing portion 28 points.

Figure 2B:
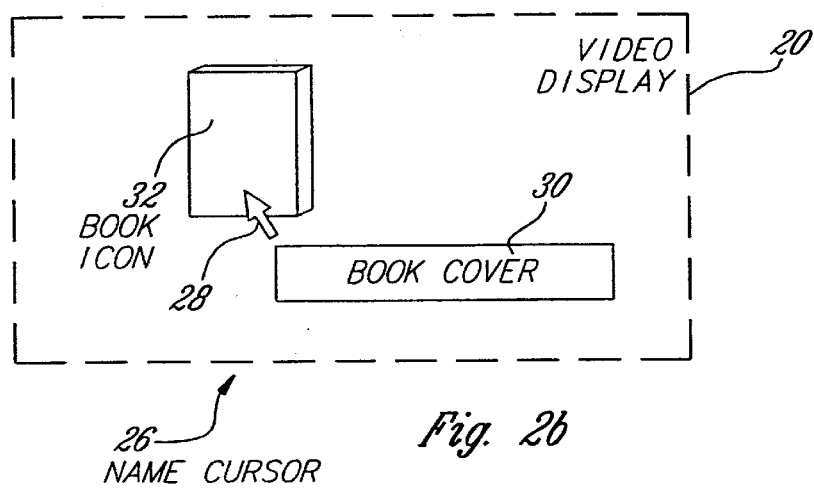

FIG. 2b shows an example of how the name cursor 26 is used. Suppose that a book icon 32, representing a book of text stored in the system 10 (FIG. 1), is displayed on the video display 20. When the pointing portion 28 of the name cursor 26 points to the book icon 32, the name box 30 of the name cursor displays the phrase "Book Cover". More generally, the name box 30 displays the name of the item to which the pointing portion 28 points. The user interface may be programmed such that, when the pointing portion 28 points to nothing of significance, the name box 30 remains blank. Alternatively, the user interface may be programmed so that the name box 30 disappears in such an instance.

Figure 2C:
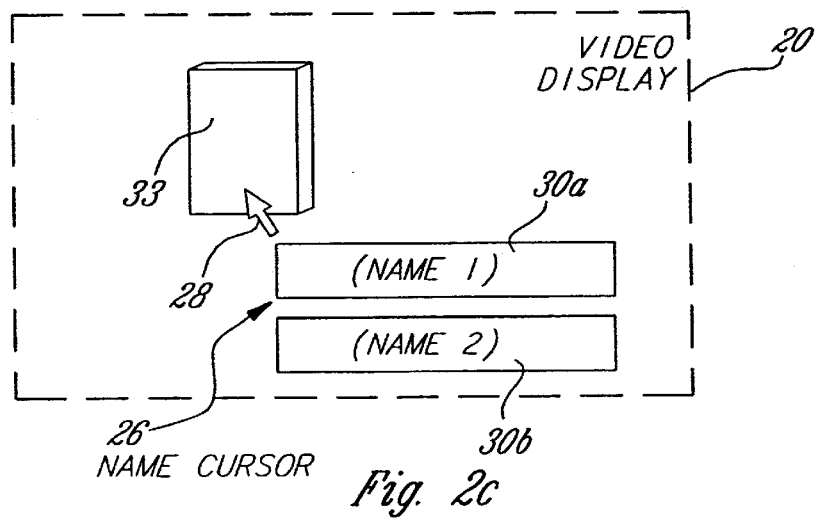

In some circumstances, the name cursor 26 may include two name boxes 30a and 30b, such as shown in FIG. 2c. For instance, in an operating system that supports drag and drop operations, two names may be displayed in the name cursor 26 during a drag and drop operation. In particular, the name of the source object and the name of the target object are shown in name boxes 30a and 30b, respectively. The target object name is not shown until the pointing portion 28 of the name cursor 26 is moved to point to the target object. A source object icon 33 for the source object is dragged along with the cursor during the drag portion of the operation.

Figure 3:
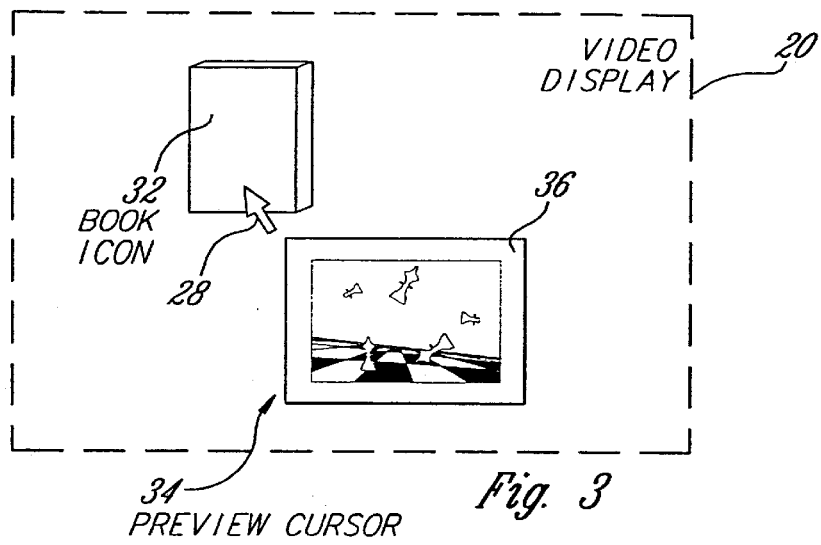
FIG. 3 is a diagram showing an example of a preview cursor generated in accordance with the preferred embodiment of the present invention.

FIG. 3 shows an example of a preview cursor 34, which includes a preview portion 36 and the same pointing portion 28 as the name cursor 26. The preview cursor 34 provides a preview of the contents of the object to which the cursor points. In the example shown in FIG. 3, the preview cursor 34 points to the book icon 32 displayed on the video display 20. The preview portion 36 holds graphical data depicting a preview of the contents of the object (i.e., the book icon 32) to which the pointing portion 28 points. In the example of FIG. 3, the book concerns chess, and the preview portion 36 shows a graphical scene of chess pieces flying through the air.

Figure 4:
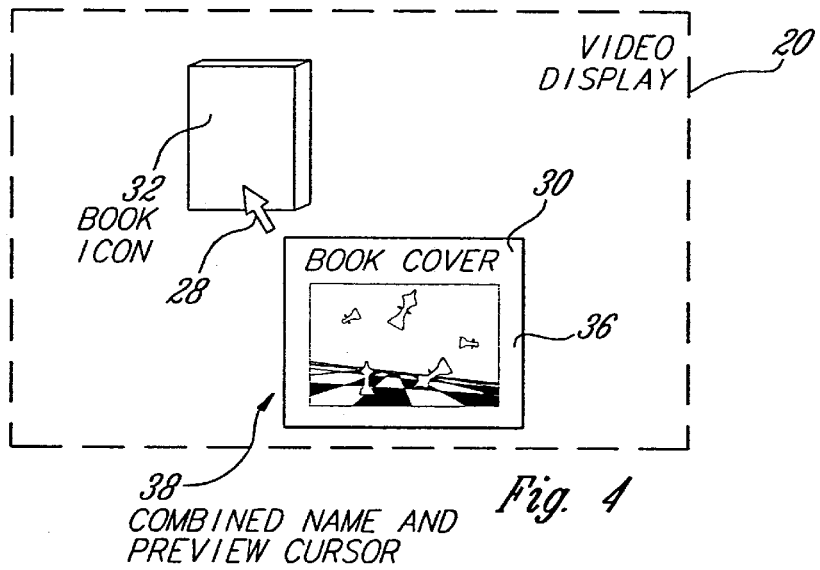
FIG. 4 is a diagram showing an example of combined name and preview cursor generated in accordance with the preferred embodiment of the present invention.

The name cursor 26 (FIGS. 2a, 2b and 2c) and the preview cursor 34 (FIG. 3) may be combined into a combined name and preview cursor 38, as shown in FIG. 4. The combined name and preview cursor 38 includes three components. First, the preview cursor 38 includes a pointing portion 28 for pointing to an object on the video display 20, at least one name box 30 (two name boxes are used with a drag and drop operation, in a fashion analogous to that described above for the name cursor) for displaying the name of the object to which the pointing portion points and a preview portion 36 for holding a preview of the contents of the object to which the pointing portion points. In the example illustrated in FIG. 4, the name box 30 displays the phrase "Book Cover", whereas the preview portion 36 displays the graphic of chess pieces flying through the air.

Figure 5:
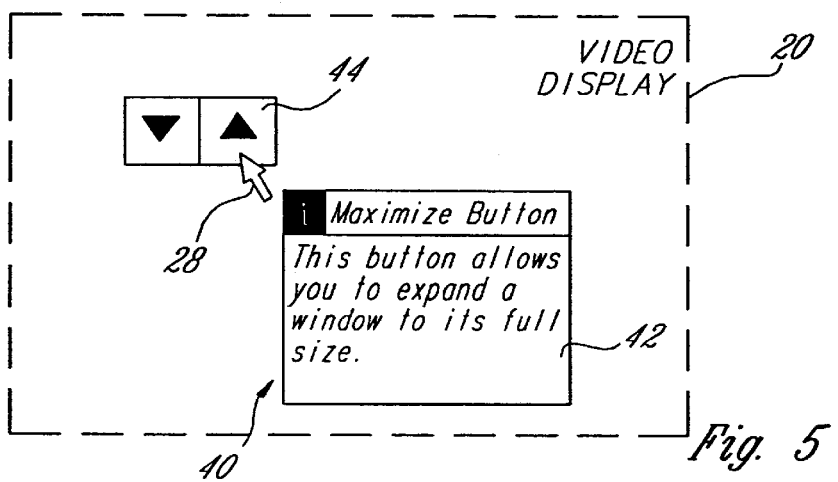
FIG. 5 is a diagram showing an example of property cursor generated in accordance with the preferred embodiment of the present invention.

An additional variety of information cursor that is provided by the preferred embodiment of the present invention is a property cursor 40, such as shown in FIG. 5. A property cursor 40 includes the pointing portion 28 and a property box 42. The property box 40 displays property information (often including the name of the object) regarding the object to which the pointer portion 28 points. In the example of FIG. 5, the property cursor 40 serves as a help cursor that displays help information in the property box 42 for the object to which the pointing portion 28 points. In FIG. 5, the pointer portion 28 points to a maximize button 44. The text in the property box 42 identifies the nature of the maximize button 44 to which the pointer portion 28 points and displays relevant help information regarding this object.

The implementation of the preferred embodiment of the present invention will now be described with reference to the Microsoft WINDOWS, version 3.1, operating system. In particular, the operating system 22 is an embellished version of the Microsoft WINDOWS, version 3.1, operating system that supports the use of information cursors. The present invention is not limited to implementations with this operating system; rather, those skilled in the art will appreciate that the present invention may be implemented with other operating systems as well.

In explaining the implementation of the preferred embodiment of the present invention, it is helpful to consider the type of input device that is used. In the discussion that follows, it is assumed that the mouse 18 (FIG. 1) is used as the input device for manipulating the position of the cursor on the video display 20. It should, nevertheless, be appreciated that the present invention is not limited to the use of a mouse as the input device; rather, other input devices, such as a keyboard or a pointing device, may alternatively be used.

The operating system 22 (FIG. 1) logically divides the user interface into a number of windows. In general, each window has a separate window procedure associated with it. The operating system 22 maintains a message queue for each program that generates windows. As a program may generate multiple windows, the message queue may hold messages for multiple windows. When an event occurs, the event is translated into a message that is put into the message queue for the program. The program retrieves and delivers the message to the proper window procedure by executing a block of code known, as the "message loop". The window procedure that received the message then processes the message.

When a user positions a cursor with the mouse 18 over a window or clicks the mouse by depressing one of the mouse buttons within the window, the procedure for the window receives a mouse message. The operating system 22 provides a number of predefined mouse messages. The mouse messages specify the status of mouse buttons and the position of the cursor within the window. The position of the cursor within the window is specified in (X, Y) coordinates relative to the upper left-hand cover of the window. The window procedure receives the mouse message and utilizes the information contained in the message to respond to the mouse activities. A new mouse message need not be generated for every single pixel position change of a mouse within a window; rather, a message may be generated each time the mouse moves more than a threshold number of pixels transversed by the mouse.

This message system plays a role in the implementation of information cursors described above. The appearance of the cursors on the video display 20 (FIG. 1) is dictated by bitmaps stored within the operating system 22. The role that the message loop serves in the implementation of the information cursors can be seen in the flowchart of FIG. 6, which illustrates the steps performed by the system 10 (FIG. 1) when the cursor moves into a window that is displayed on the video display 20. Initially, the cursor position is moved by the mouse 18 or other input device to point within the window (step 48 in FIG. 6). A message is generated and sent to the application program that is executing, which, in turn, forwards the message to the window procedure associated with the window (step 50). The message specifies the position of the cursor in the window as described above. The window procedure then determines what is displayed at the cursor position within the window (step 52). For instance, an object may be at the specified position or nothing of particular importance may be at the specified position. A determination is made whether the specified position corresponds to the position of an object with an identity (step 54). In other words, a determination is made whether a named entity is present at the specified cursor position. If a named entity is present at the specified cursor position, the information regarding the object at the specified cursor position is displayed in the information cursor (step 56 ). If, however, a named entity is not present at the specified cursor position, either a conventional cursor is displayed or the information containing portion (e.g., name box 30, preview portion 36 or property box 40) of the information cursor is shown in blank (step 57). The choice between these options is controlled by the application program.

Figure 6:
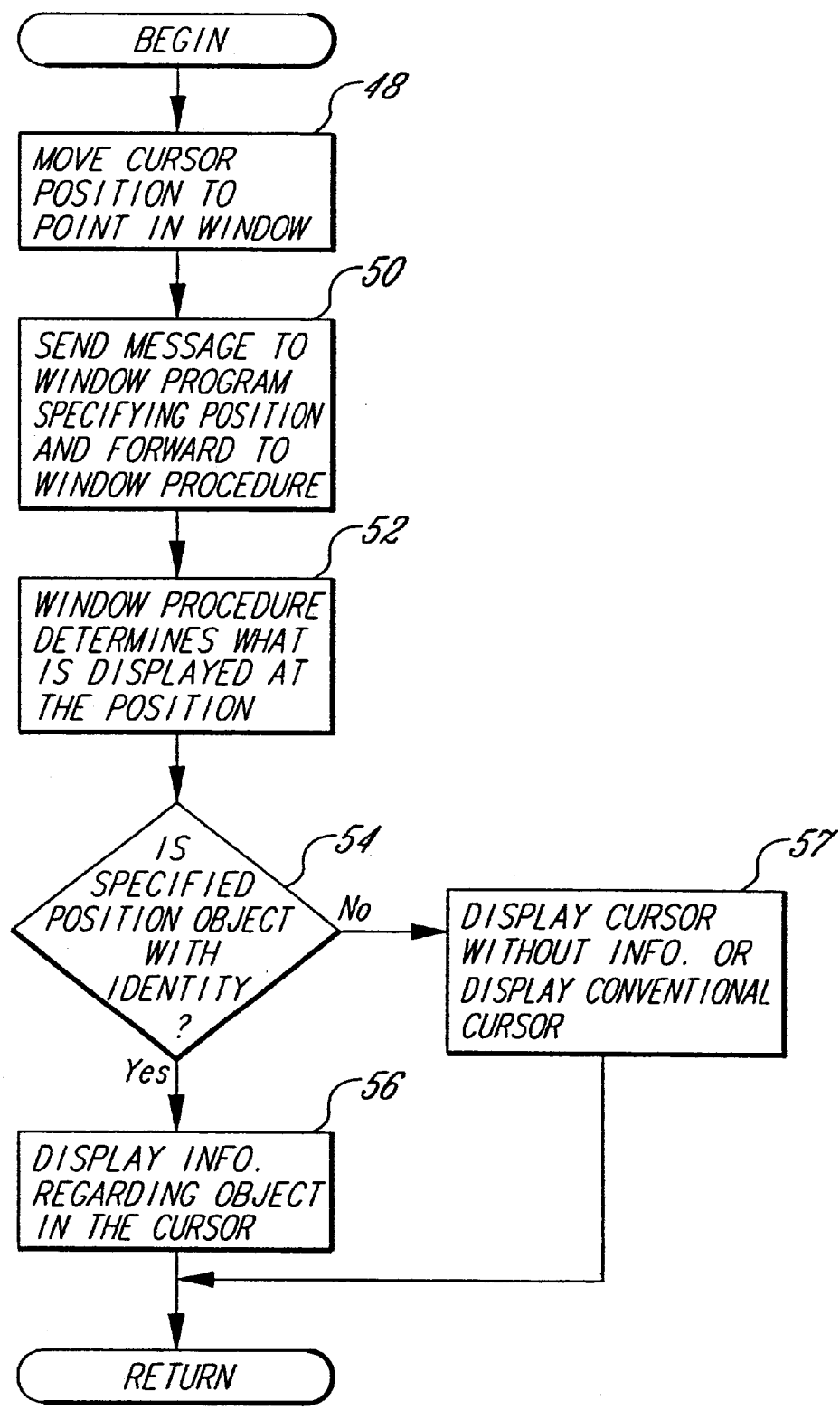
FIG. 6 is a flowchart showing the steps performed to implement the information cursors of the preferred embodiment of present invention.
Figure 7:
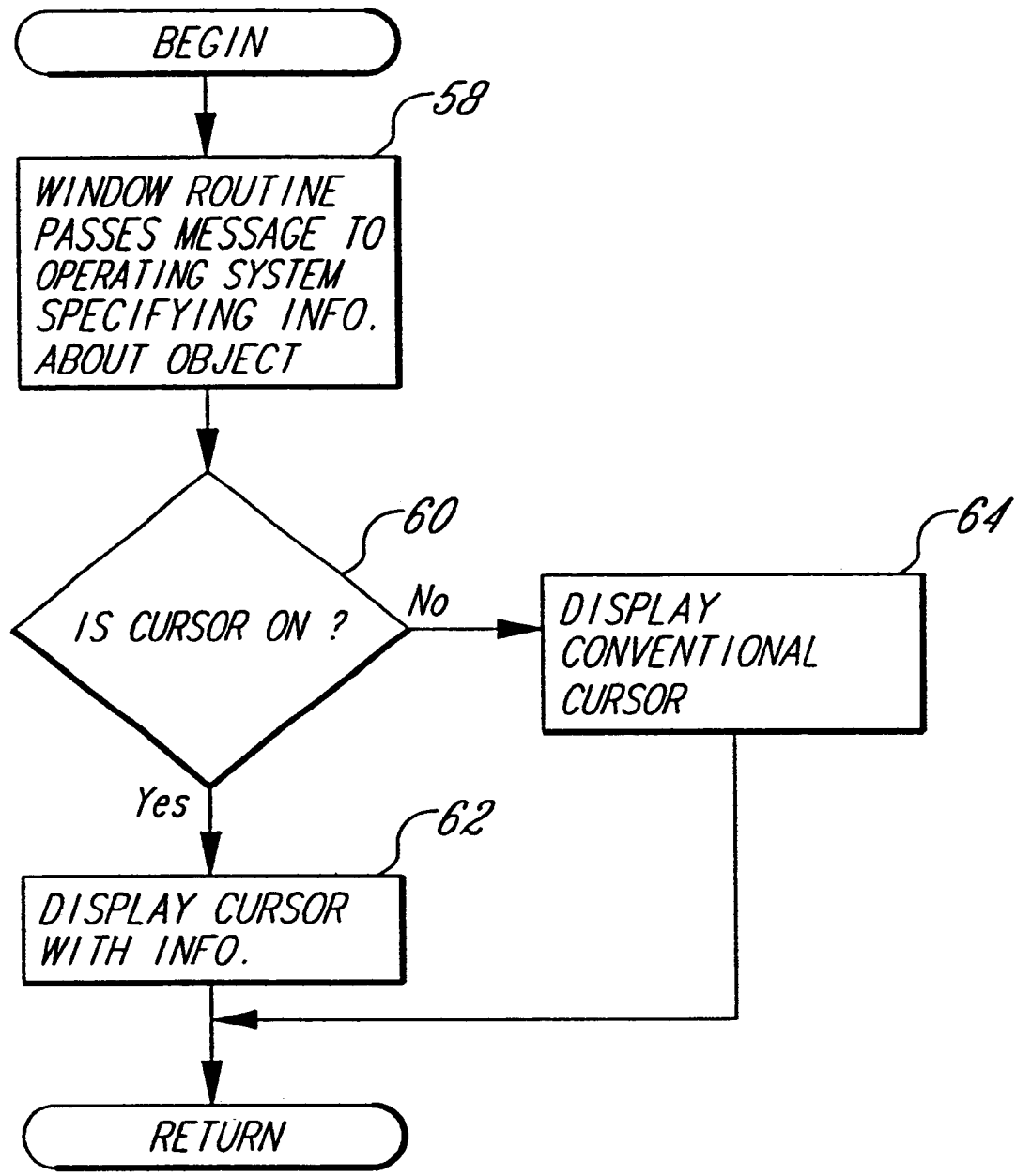
FIG. 7 is a flowchart illustrating in more detail how information about an object is displayed in an information cursor generated in accordance with the preferred embodiment of the present invention.

FIG. 7 is a flowchart showing in more detail the steps that must be performed in order to realize step 56 of FIG. 6. After the window procedure has determined what is at the specified cursor position, the procedure passes a message to the operating system 22 (FIG. 1) that tells the operating system what type of cursor to display and sets forth the contents and type of information to be displayed in the cursor (step 58 in FIG. 7). Suppose that the application program desires to display a name cursor 26 (FIG. 2*a*). A message requesting that a name cursor be displayed is passed to the operating system 22 along with a text string for the name to be displayed in the name box 30. However, if the cursor to be displayed is a preview cursor 34 (FIG. 3), a message specifying that a preview cursor is required is sent. The message includes a pointer to a bitmap of graphical information that the operating system 22 should use in the preview portion 36. Still further, a property cursor 46 may be requested in the message. The message, in such a case, includes a text string for the text of property information to be displayed in the property box 42.

Whether the information cursor is displayed depends upon whether the information cursor is designated as "On" or "Off". The operating system checks whether the information cursor is "On" (step 60). In certain instances, the user may have the option of specifying whether the information cursor is "On" or "Off". Alternatively, the information cursors may be programmed by the application program or operating system 22 (FIG. 1) such that they are automatically turned "On" when the conventional cursor points to a named entity. This latter option provides an automatic mechanism for switching "On" or "Off" the information cursor. If the information cursor is not "On", a conventional cursor is displayed (step 64). As an example, consider the name cursor 26. If the name cursor 26 is "Off", the name box 30 is not displayed (FIG. 2*a*). Instead, a conventional cursor is displayed. On the other hand, if the name cursor is "On", the pointing portion 28 is displayed along with the appropriate name information (step 62) to be used in the name box.

Figure 8:
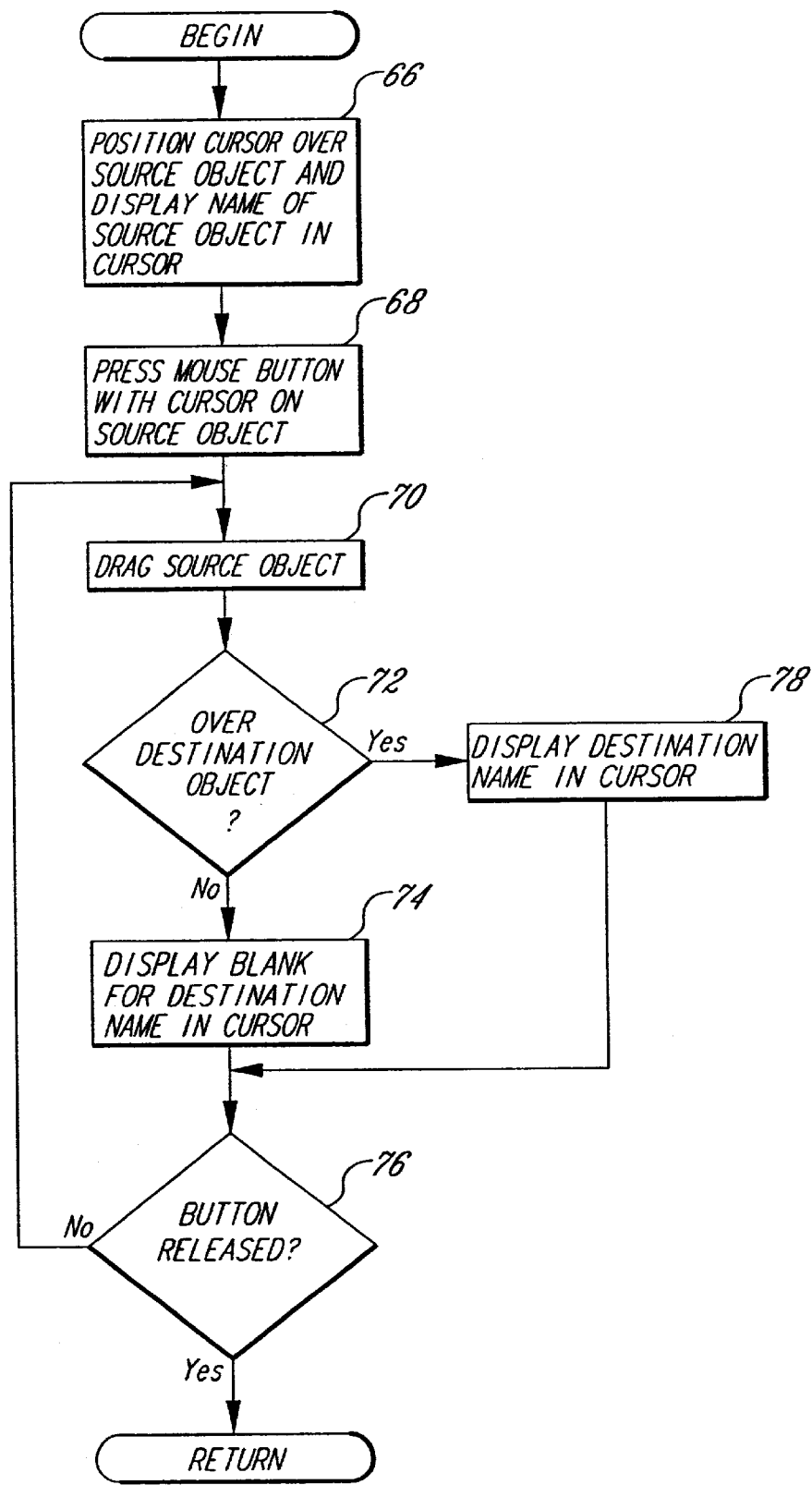
FIG. 8 is a flowchart illustrating the steps performed by the preferred embodiment of the present invention in displaying a name cursor in a drag and drop operation.

The name cursor 26 (FIG. 2*c*) that is shown during a drag and drop operation is somewhat unique relative to the other types of information cursors. FIG. 8 is a flowchart showing the steps performed by the preferred embodiment of the present invention to display the name cursor 26 during a drag and drop operation. The generation of messages from the mouse 18 and the response of window procedures are the same as described above for the single-name cursor. In step 66, the pointing portion 28 of the name cursor points to a source object, and the name of the source object is displayed in the first name box 30*a* (see FIG. 2*c*), such as described above for the single-name-box name cursor of FIGS. 2*a* and 2*b*. A user then depresses the mouse button while the pointing portion 28 of the name cursor points to the source-object icon (step 68) and drags the source-object icon by moving the mouse and keeping the button depressed (step 70) until the source-object icon is positioned over a destination-object icon.

The system performs a loop while the source-object icon is being dragged. In particular, the system checks whether the pointing portion 28 of the name cursor is positioned over a destination object (step 72). If not, a blank is displayed for the destination object name in the second name box 30*b*. The system checks whether the mouse is released (step 76). If not, the drag continues (step 70). When the pointing portion is positioned over a destination object, the name of the destination object is then displayed in the second name box 30*b* (see FIG. 2*c*) of the name cursor 36 (step 72 of FIG. 8). The loop continues until the mouse button is released to terminate the drag and drop operation.

While the present invention has been described with reference to a preferred embodiment thereof, those skilled in the art will appreciate that various changes and form of the detail may be made without departing from the scope of the present invention as defined by the appended claims.

What is claimed is:

1. A data processing system comprising:
   (a) a video display;
   (b) an input device operable by a user to communicate with the data processing system; and
   (c) a processor to execute computer instructions from a medium, the computer instructions to cause the processor to perform;
   (c1) displaying an information cursor with a pointing portion for pointing to locations on the video display and an information portion for displaying information in a selected relative position with respect to the pointing portion,
   (c2) in response to a user using the input device, positioning the information cursor so that the pointing portion of the information cursor points to one of a plurality of objects that is displayed and the information portion is in the selected relative position with respect to the pointing portion, and (c3) displaying currently undisplayed information on the video display about the one object to which the pointing portion of the information cursor points in the information portion of the information cursor.

2. The data processing system of claim 1, wherein the input device is a mouse.

3. The data processing system of claim 1, wherein the input device is a keyboard.

4. The data processing system of claim 1, wherein step (c3) further comprises displaying a name of the one object indicated by the pointing portion of the cursor in the information portion of the cursor.

5. The data processing system of claim 1, wherein step (c3) further comprises displaying a preview of contents of the object indicated by the pointing portion of the cursor in the information portion of the cursor.

6. The data processing system of claim 1, wherein step (c3) further comprises displaying property information about the one object indicated by the pointing portion of the cursor in the information portion of the cursor.

7. In a data processing system having a video display and an input device, a method comprising the steps of:

(a) displaying objects on the video display, said objects including an information cursor with a pointing portion for pointing to locations on the video display and an information portion for displaying information;

(b) in response to a user using the input device, positioning the information cursor so that the pointing portion of the information cursor points to one of the objects that is displayed; and (c) displaying, in the information portion of the information cursor on the video display, a presently undisplayed preview of contents of the object including graphical data to which the pointing portion of the information cursor points.

8. The method of claim 7, wherein step (c) further comprises displaying, in the information portion of the information cursor, a name of the object to which the pointing portion of the information cursor points.

9. A data processing system comprising:

(a) a video display;

(b) an input device operable by a user to communicate with the data processing system; and (c) a processor to execute computer instructions from a medium, the computer instructions to cause the processor to perform;

(c1) displaying objects on the video display, said objects including an information cursor with a pointing portion for pointing to locations on the video display and an information portion for displaying information, (c2) in response to a user using the input device, positioning the information cursor so that the pointing portion of the information cursor points to one of the objects that is displayed, and (c3) displaying, in the information portion of the information cursor on the video display, a presently undisplayed preview of contents of the object including graphical data to which the pointing portion of the information cursor points.

10. The data processing system of claim 9, wherein step (c3) further comprises displaying, in the information portion of the information cursor, a name of the object to which the pointing portion of the information cursor points.

11. In a data processing system having a video display and an input device, a method comprising the steps of:

(a) displaying a cursor having a pointing portion for pointing to locations on the video display;

(b) in response to a user using the input device, positioning the cursor so that the pointing portion of the cursor points to one of a plurality of objects that is displayed; and (c) displaying, in a selected relative position to the pointing portion, presently undisplayed information about the object to which the pointing portion of the cursor points.

12. The method of claim 11, wherein when the cursor is moved across the one object to another portion of the one object in response to the user using the input device, the information about the object moves relative to the movement of the cursor.

13. The method of claim 11, wherein the information includes graphical data.

14. The method of claim 11, wherein the information includes a name of the one object to which the pointing portion of the cursor points.

15. A computer-readable medium whose contents cause a computer system having a video display and an input device to perform the steps of:

displaying objects on the video display, said objects including an information cursor with a pointing portion for pointing to locations on the video display and an information portion for displaying information;

in response to a user using the input device, positioning the information cursor so that the pointing portion of the information cursor points to one of the objects that is displayed; and displaying, in the information portion of the information cursor on the video display, a presently undisplayed preview of contents of the object including graphical data to which the pointing portion of the information cursor points.

16. The computer-readable medium of claim 15, wherein step (c) further comprises displaying, in the information portion of the information cursor, a name of the object to which the pointing portion of the information cursor points.

* * * * *